July 15, 1969 E. F. HASELTON, JR 3,456,084

SWITCHING NETWORK EMPLOYING LATCHING TYPE SEMICONDUCTORS

Filed Oct. 22, 1965 2 Sheets-Sheet 1

INVENTOR.
ERNEST F. HASELTON, JR.
BY
Stanley M. Schwajin
ATTORNEY

INVENTOR.
ERNEST F. HASELTON, JR.
BY
Stanley M. Schurgin
ATTORNEY

United States Patent Office 3,456,084
Patented July 15, 1969

3,456,084

SWITCHING NETWORK EMPLOYING LATCHING TYPE SEMICONDUCTORS

Ernest F. Haselton, Jr., West Concord, Mass., assignor to Sylvania Electric Products Inc., a corporation of Delaware Filed Oct. 22, 1965, Ser. No. 501,419
Int. Cl. H04m *3/00;* H04q *1/00;* H03k *17/00*
U.S. Cl. 179—18 14 Claims

ABSTRACT OF THE DISCLOSURE

Latching type semiconductors are employed to selectively connect a plurality of input transmission lines to a plurality of output transmission lines. In response to coincident control pulses, a coupling circuit activates the appropriate latching type semiconductor to thereby establish a transmission path between selected lines of the input and output transmission lines.

This invention relates generally to switching networks, and more particularly to electronic switching networks for use in communication systems.

In many switching applications, such as in a telephone central office switching network, a transmission path is provided between given input and output lines by selectively establishing crosspoint connections in the switching network. Such a switching network typically includes a plurality of switching matrices between groups of input and output lines, each stage containing one or more switching matrices. In some switching networks, the matrices are interconnected to provide a plurality of paths between each line in the input line group and each line in the output line group, while other switching networks provide a unique path between any given line in the input line group and any given line in the output line group.

Switching networks are known which employ various types of semiconductor devices or circuits as the crosspoint elements. For example, U.S. Patent No. 3,118,973 discloses a system utilizing diodes, transistors and unijunction transistors to provide crosspoint connections, and U.S. Patent No. 3,027,427 discloses a system wherein four-layer PNPN diodes act as the crosspoint elements. These known networks, however, are not completely satisfactory in practical systems for one reason or another. For example, networks employing transistors as the crosspoint elements require additional components to provide the requisite memory function, and generally require decoding matrices to provide discrete addressing of selected crosspoints. Networks utilizing PNPN diodes for crosspoints require high firing potentials to render them conducting, and further require additonal selection techniques to prevent the fan-out inherent in such systems; that is, the tendency to fire unselected crosspoint elements not a part of the desired transmission path. Moreover, since the PNPN diode is a two terminal device, it is necessary to provide control connections in the transmission path; thus, the control circuitry is not isolated from the actual transmission path. A further limitation of the PNPN diode is its relatively high junction capacitance which restricts the operating bandwidth of the transmission path.

It is, therefore, a principal object of this invention to provide an improved electronic switching network.

A further object of this invention is to provide a switching network requiring a reduced number of components for each crosspoint.

Another object of this invention is to provide a switching network wherein each crosspoint has an inherent memory capability.

Still another object of this invention is to provide an electronic switching network which allows the establishment of a selected transmission path by addressing a line circuit connection and a link circuit connection without addressing each crosspoint device in the selected path.

Yet another object of this invention is to provide a switching network requiring low power, having an increased operating bandwidth, and which is susceptible to microminiature integrated circuit design.

Briefly, the invention resides in the utilization latching type semiconductors with gate control, such as silicon-controlled-rectifiers or silicon-controlled-switches, as crosspoint devices to provide connections between input and output transmission lines. The control of the latching semiconductor is effected by appropriate biasing of the input and output terminals of the device, and by applying a suitable pulse to the gate electrode to render it conducting and thereby establish the desired transmission path. Once the device conducts the gate pulse is no longer required to maintain conduction if sufficient holding current passes through the device; hence, there is no need for associated memory circuitry to maintain a selected transmission path. Furthermore, the gating pulse necessary to render this class of devices conducting is a low level current pulse of short duration, of the order of a microsecond; thus, a switching matrix employing these latching semiconductor devices operates at high speed and with low power consumption.

Other features of this class of devices meet the requirements usually necessary in switching networks. That is, they have a high-impedance, low-current characteristic when in the unswitched or non-conducting state, and a low-impedance, high-current characteristic when in the switched or conducting state. Furthermore, there is more than adequate isolation between the gate electrode and the input and output electrodes of the devices, so that the device is not subject to false turn-on due to system transients. In addition, the switching network utilizing such devices has low-current, low voltage characteristics, thereby inherently providing a minimal transient characteristic and, because of the relatively low junction capacitance of the device, a higher frequency handling capability.

The foregoing and other objects, features and advantages of the invention, and a better understanding of its construction and operation will become apparent from the following detailed description, taken in conjunction with the accompanying drawings, in which.

Figure 1:
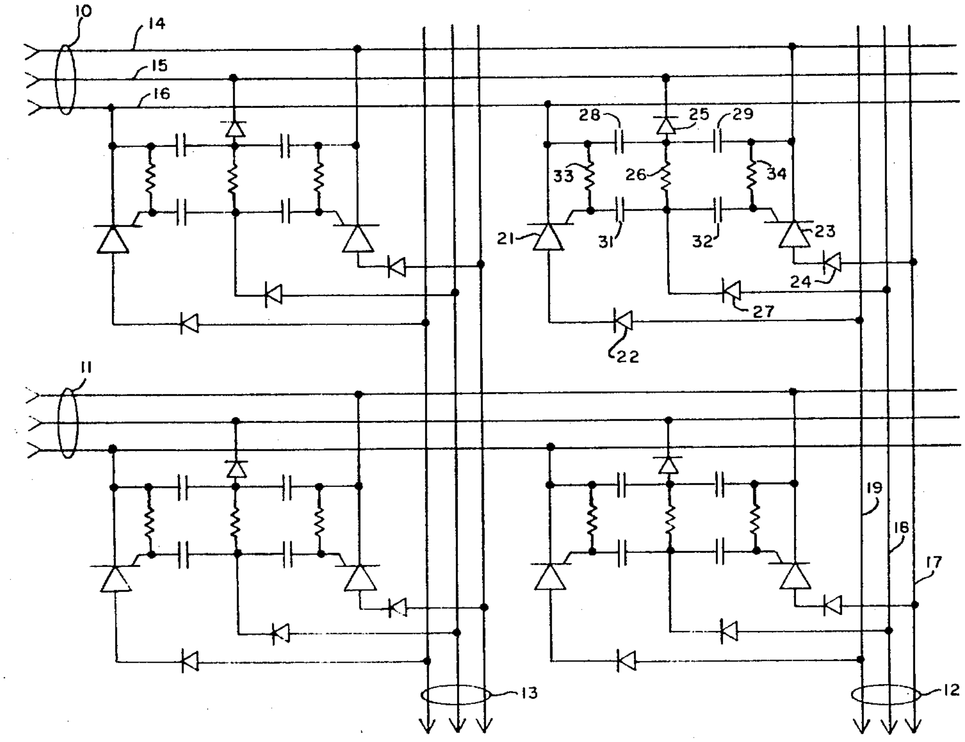
FIG. 1 is a schematic circuit diagram of a 2 x 2 switching matrix according to the invention.

Referring to FIG. 1, there is shown a switching matrix according ot the invention which for simplicity and ease of understanding is a 2 x 2 matrix although the concepts embodied therein are applicable to any M x N matrix. The matrix consists of two input line groups 10 and 11, intersecting with two output line groups 12 and 13 to provide four possible transmission paths through the matrix. Each of the line groups contains three lines, two being transmission lines and one being a control line. For example, line group 10 contains transmission lines 14 and 16, and control line 15, and line group 12 contains transmission lines 17 and 19, and control line 18. Identical crosspoint switching circuits are associated with each of the above mentioned intersections of input and output line groups. For example, referring to the intersection of input line group 10 with output line group 12, the switching circuit consists of a silicon controlled rectifier (SCR) 21 with its cathode connected directly to line 16, and with a diode 22 connected between the anode of the SCR and output line 19. In similar fashion, the cathode of an SCR 23 is connected directly to input line 14, with its anode connected via diode 24 to output line 17. A series circuit consisting of a diode 25, a resistor 26 and a diode 27 is connected between input line 15 and output line 18, the resistor 26 being connected between the anode of diode 25 and the cathode of diode 27. Capacitors 28 and 29 are connected between the cathodes of SCR's 21 and 23, respectively, the anode of diode 25, while capacitors 31 and 32 are connected between the gate electrodes of SCR's 21 and 23, respectively, and the cathode of diode 27. Resistors 33 and 34 are connected between the cathode and gate electrodes of respective SCR's 21 and 23.

The operation of the circuit of FIG. 1 is illustrated in the following description by the manner in which direct connections are established between input lines 14 and 16 and output lines 17 and 19, respectively. In the quiescent condition, i.e. non-conducting, a forward bias potential below the SCR breakdown potential is placed between lines 14 and 17 and between lines 16 and 19. To initiate conduction of SCR's 21 and 23 a positive pulse of short duration is applied to line 15 and a negative pulse of equal duration is applied to line 18, thereby causing current to flow through diode 27, resistor 26 and diode 25, and developing a positive potential across resistor 26. This potential is transmitted via capacitors 28 and 31 to the cathode and gate electrodes, respectively, of SCR 21, and, similarly, is transmitted by capacitors 29 and 32 to the respective cathode and gate electrodes of SCR 23. This provides the flow of gate to cathode current in the respective SCR's, thereby initiating SCR turn-on. Since the SCR's are forward biased, the flow of gate to cathode current in turn initiates the flow of anode to cathode current. As the anode to cathode current increases above the required holding current of the SCR, the gate electrode loses control over the SCR operation. As the SCR's exceed their holding current, they exhibit a very low impedance, thereby providing the desired direct connections between input transmission lines 14 and 16 and output transmission lines 17 and 19, respectively. To effect a disconnection between the input and output transmission lines, the holding potential is effectively removed from input lines 14 and 16 for a period of time sufficient to reduce the current in the SCR's below the required holding current. For example, this can be accomplished by placing positive going pulses of short duration on lines 14 and 16.

It is to be understood that the foregoing description of the circuit of FIG. 1, commonly referred to as a two-wire balanced-to-ground configuration, is adaptable to a one-wire unbalanced-to-ground matrix configuration. For example, if transmission line 14 in line group 10 and transmission line 17 in line group 12 were deleted from the matrix, along with capacitors 25 and 32, resistor 34, SCR 23, and diode 24, there would be the afore-mentioned one-wire unbalanced configuration. The operation and control of the remaining portion of the crosspoint configuration is essentially the same as that described above. It is further to be understood that the SCRs can be replaced by silicon-controlled switches without affecting the general operation or characteristics of the matrix.

Figure 2:
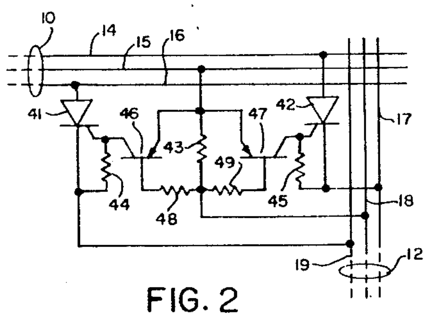
FIGS. 2, 3 and 4 are schematic circuit diagrams of alternate embodiments of crosspoint switches according to the invention.
Figure 3:
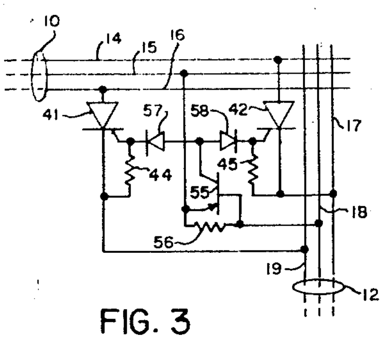

The circuits of FIGS. 2 and 3 represent alternate embodiments of a crosspoint switch that may be utilized in a switching matrix such as shown in FIG. 1. For ease of illustration and understanding, only one crosspoint switch is shown, it being understood that all crosspoint switches in a matrix are identical in construction and operation. The circuit of FIG. 2 is illustrated as replacing the crosspoint switch at the intersection of input line group 10 and output line group 12 of FIG. 1. The anode electrode of an SCR 41 is connected to input line 16 with the cathode electrode of the SCR connected to output line 19. Similarly, the anode of an SCR 42 is connected to input line 14 and the cathode connected to output line 17. Resistors 44 and 45 are connected between the gate and cathode electrodes of SCR's 41 and 42 respectively, the gate electrodes also being directly connected to the respective collectors of transistors 46 and 47. A resistor 43 is connected between input line 15 and output line 18, with output line 18 being connected to the base electrodes of transistors 46 and 47 via resistors 48 and 49, respectively. The emitter electrodes of transistors 46 and 47 are directly connected to input line 15.

The circuit of FIG. 3 represents a modification of the crosspoint switch in which two diodes under the control of a single transistor replace the two control transistors shown in FIG. 2. In this embodiment the two SCR's 41 and 42 are connected between input lines 16 and 14 and output lines 19 and 17, respectively, with the resistors 44 and 45 connected between the gate and cathode electrodes of the respective SCR's. A resistor 56 is connected between input line 15 and output line 18, and the base electrode of a transistor 55 is connected directly to line 18. The emitter of transistor 55 is directly connected to input line 15, and the collector of the transistor is connected via diodes 57 and 58, respectively, to the gate electrodes of SCR's 41 and 42.

In operation, the crosspoint switches of FIGS. 2 and 3 require that SCR's 41 and 42 be forward biased by a potential less than their breakdown potential. To initiate conduction of the crosspoint switch, coincident positive and negative pulses of short duration are applied to control lines 18 and 15, respectively. In the circuit of FIG. 2, the pulses applied to lines 15 and 18 create a potential difference across resistor 43 thereby forward biasing the base-emitter junctions of transistors 46 and 47. Because of the potentials existing on lines 17 and 19, the transistors 46 and 47 are rendered conducting with the collector currents passing through resistors 44 and 45, respectively. The voltage drop across resistors 44 and 45 forward bias the gate-to-cathode junctions of SCR's 41 and 42 resulting in gate-to-cathode current through the SCR's. Since the SCR's are forward biased, the gate-to-cathode current triggers the flow of anode-to-cathode current through the SCR's. When this anode-to-cathode current exceeds the holding current level of the devices, the gate electrodes no longer exercise control and the devices become latched into conduction, therbey providing the desired direct connections between input lines 14 and 16 and output lines 17 and 19, respectively.

The operation of the switch of FIG. 3 is similar to that of FIG. 2, since the control pulses applied to lines 15 and 18 create a potential across the resistor 56 which results in conduction of transistor 55. However, in this circuit, the collector current of the transistor is split via diodes 57 and 58, passing through the resistors 44 and 45 to thereby switch SCR's 41 and 42.

To effect a disconnect, that is to render the SCR's 41 and 42 non-conducting, the holding potential is removed from lines 17 and 19 for a time sufficient to reduce the current through the SCR's below the required holding level. This can be accomplished, for example, by placing positive going pulses of the required duration on lines 17 and 19. As in the circuit of FIG. 1, the circuits of FIGS. 2 and 3 may be modified to provide one-wire unbalanced-to-ground operation, rather than the illustrated two-wire balanced operation.

Figure 4:
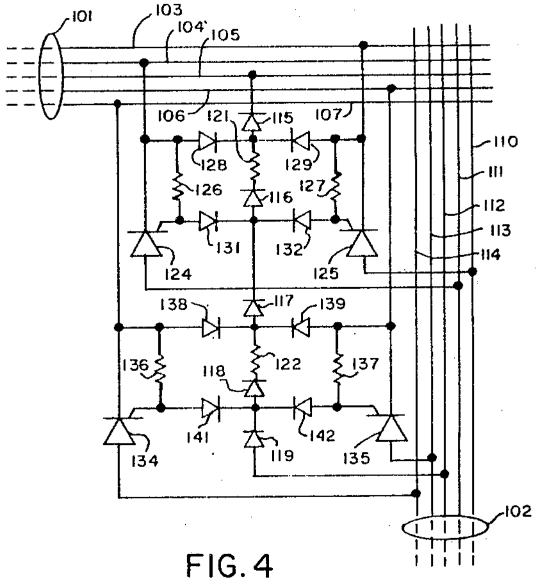

The circuit of FIG. 4 represents still another embodiment of the invention, designed to provide a four-wire balanced-to-ground crosspoint switch. Again for simplicity, only one crosspoint switch is illustrated, it being readily apparent that a multiplicity of identical switches can be arranged in matrix configuration, as in FIG. 1, to provide an M x N switching matrix. In the crosspoint switch of FIG. 4, the input line group 101 and the output line group 102 each contain four transmission lines, 103, 104, 106, 107 and 110, 111, 113, 114, respectively, and one control line, 105 and 112, respectively. A first pair of SCR's 124 and 125 are connected between input lines 103 and 104 and output lines 110 and 111, respectively, with their cathodes connected directly to the input lines and their anodes connected to the output lines. In similar fashion, a second pair of SCR's 134 and 135 are connected between input lines 107 and 106 and respective output lines 114 and 113. A series string, consisting of a diode 115, resistor 121, diodes 116 and 117, resistor 122, and diodes 118 and 119, is connected between input control line 105 and output control line 112, with the cathodes of the diodes in the series string being directed toward the input control line. Four additional diodes 131, 132, 141 and 142 have their anodes connected, respectively, to the gate electrodes of SCR's 124, 125, 134 and 135. The cathodes of diodes 131 and 132 are connected directly to the anode of diode 116, while the cathodes of diodes 141 and 142 are connected to the anode of diode 118. A second set of four diodes 128, 129, 138 and 139 have their respective anode electrodes connected to the cathodes of the SCR's 124, 125, 134 and 135. The cathodes of the diodes 128 and 129 are connected directly to the anode of diode 115, while the cathodes of diodes 138 and 139 are directly connected to the anode of diode 117.

The operation of the crosspoint switch of FIG. 4 is similar in most respects to the operation of the crosspoint switches of FIGS. 1, 2 and 3. Initially, suitable potentials exist on the input and output transmission lines to forward bias SCR's 124, 125, 134 and 135, the bias potentials being below the breakdown potential of the SCR's. Positive and negative pulses of short duration are applied simultaneously to input control line 105 and output control line 112, respectively, thereby developing a pulse potential across the series string connected between these control lines. This pulse potential is divided across resistors 121 and 122 so that half exists across each of the resistors. The pulse current is divided so that instantaneous currents equal in magnitude are coupled by the junction capacitances of diodes 131, 132, 141 and 142 through resistors 126 and 127, and through resistors 136 and 137. The potentials developed across these resistors due to these instantaneous pulse currents forward bias the gate to cathode junctions of SCR's 124, 125, 134 and 135, causing gate to cathode current to flow therethrough. As previously described, the gate to cathode current flow through an SCR initiates the flow of anode to cathode current, and, after the anode to cathode current exceeds the SCR holding current, the SCR becomes latched and the gate electrode losses control over the SCR. Once the anode to cathode current through the SCR is established, the SCR is switched from a high impedance state to a low impedance state, thereby effecting the desired direct connections between the input and output transmission lines.

To effect a disconnect of the crosspoint switch, that is to change the SCR's back to a non-conducting or high impedance state, it is necessary only to reduce the anode to cathode current through the respective SCR's to a level below the holding current level. This may be accomplished by a number of methods including those previously described in conjunction with the crosspoint switches of FIGS. 1, 2 and 3.

Figure 5:
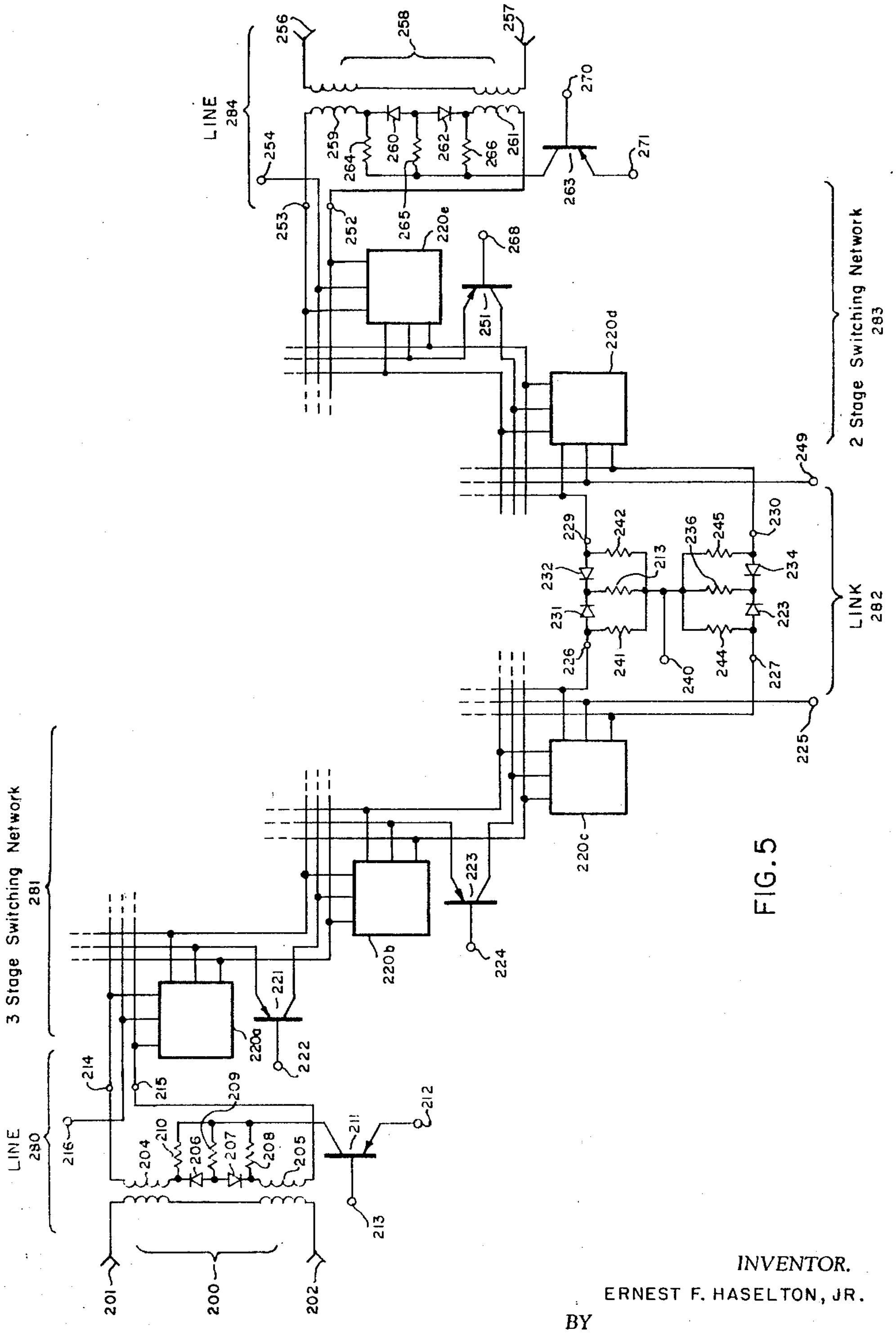
FIG. 5 is a partial schematic circuit diagram of a five stage switching network according to the invention.

FIG. 5 is a partial schematic representation of a switching system according to the invention. This system is comprised of a first Line section 280, containing a multiplicity of line circuits, a three stage switching network 281 each stage of which contains a like multiplicity of switching matrices, a link section 282 containing a like multiplicity of link circuits, a two stage switching network 283 each stage containing a like multiplicity of switching matrices, and a second Line section 284 similarly containng a like multiplicity of line circuits. In this representation, only a single component of each major section is shown to represent a selected path through the system. It will be readily apparent to those skilled in the art that the two and three stage switching networks 283 and 281 may be either of the unique path or multiple path as shown in FIGS. 3 and 5 of copending application Ser. No. 444,139 filed Mar. 31, 1965, now Patent No. 3,389,228, and assigned to the assignee of the present invention. The choice of unique or multiple path systems will normally be dictated by system requirements.

Each line circuit consists of a transformer having a split primary winding 200 connected between input terminals 201 and 202. The secondary of the line circuit consists of split transformer windings 204 and 205 between which are connected, in back to back arrangement, diodes 206 and 207. The opposite ends of transformer windings 204 and 205 are connected directly to the respective line circuit output terminals 214 and 215. A first resistor 209 is connected between the anode electrodes of the back to back diodes and the collector of a transistor 211. Second and third resistors 208 and 210 are connected between the cathode electrodes of diodes 207 and 206, respectively, and the collector of the transistor 211. The emitter of transistor 211 is connected directly to a source of positive potential as represented by terminal 212, and the base of the transistor is connected to a source of control signals as represented by terminal 213.

Each of the link circuits connected between the three stage and the two stage switching networks consists of a pair of back to back diodes 231 and 232, with their cathodes connected together, and with their anodes connected to terminals 226 and 229, respectively. A second pair of diodes 233 and 234 are also connected back to back with their anodes connected to respective terminals 227 and 230. Two resistors 213 and 236 are connected in series between the anodes of diodes 231 and 233, and the junction of these two resistors is connected to a source of potential, represented by terminal 240. Additional resistors 241, 242, 244 and 245 are connected between the anodes of diodes 231, 232, 233 and 234, respectively, and the source of potential 240.

The schematic of FIG. 5 is representative of a complete transmission path through a switching system. The output terminals 214 and 215 from the line circuit are connected directly to the input transmission lines of the selected matrix in the first stage of the three stage switching network. The input control line for this matrix is connected to a source of control signal as represented by terminal 216. The box **220*a* represents the crosspoint switch selected from the matrix. The output transmission lines from the matrix in the first stage of the switching network are connected directly to input transmission lines of a matrix in the second stage of the switching network. A transistor 221 has its emitter connected directly to the output control line from the first stage matrix, with its collector connected directly to the input control line of the second stage matrix. Similarly, the output transmission lines from the second stage matrix are connected directly to the input transmission lines of the selected third stage matrix and a transistor 223 is connected between the control lines of the second and third stage matrix. The base electrode of the transistor 223 is connected directly to a source of control pulses as represented by terminal 224. The output control line from the third stage matrix is connected to a further source of control pulses as represented by terminal 225, and the output transmission lines from the third stage matrix are connected directly to the terminals 226 and 227, respectively, of the link circuit. The selected crosspoints in the selected matrices of the two stage switching network 283 are essentially mirror images of the second and third stages of the three stage switching network 281 with the input transmission lines of the selected matrix in the first stage of the two stage switching network connected directly to terminals 229 and 230, respectively, of the line circuit 282 and the output transmission lines of the selected matrix in the network 283 connected directly to terminals 252 and 253, respectively, of the second line circuit 284**.

For the purpose of illustration it is assumed that the path as shown in FIG. 5 has been found available but has not yet been switched from the high impedance state to the low impedance state. In this high impedance state, transistors 211 and 263 in the line circuits 280 and 284, respectively, are forward biased so that the potentials at the terminals 212 and 271 are applied to the respective line circuits. Similarly, a suitable potential exists at terminal 240. To effect the switching of the selected path to the desired low impedance state, suitable pulse potentials of short duration are simultaneously applied to terminals 216, 222, 224, 268 and 254. These pulses, being applied to the control leads of the crosspoint switches 220*a–e* initiate the turn-on of these crosspoint switches in the manner previously described. Since the SCR's associated with these crosspoint switches are forward biased, they will become latched into conducting during the duration of the short control pulses, thereby establishing the desired transmission path through the switching system. To effect the cutoff of the established transmission path, suitable pulses of short duration are applied to terminals 213 and 270 to render transsistors 211 and 263, respectively, non-conducting thereby removing the sources of holding potential 212 and 271 for a time sufficient to reduce the current through the conducting SCR's to a level below the required holding current of these devices.

The above description relates to a system having multiple transmission paths through the multi-stage switching networks. In a unique path system, the switching network control transistors such as 221, 223 and 251 may be replaced by short circuits, since once the line circuits and link circuits have been selected, there is one and only one possible transmission path through the respective multi-stage switching networks, and it is not necessary to discretely address each matrix in the switching networks.

In the above described switching system, it is readily apparent that any of the crosspoint switches described in FIGS. 1, 2, 3 and 4, or modifications thereof may be used in the boxes 220*a*–220*e*, the control of the system being essentially the same regardless of which configuration is selected. It will also be apparent to those skilled in the art that the above-described switching system has many desirable features not found in systems of the prior art. Since the link circuits contain only resistors and diodes, they have inherently broad operating bandwidth, and because of the wide bandwidth of the SCR, the entire system has an extended operating bandwidth. Further, it will be appreciated that the system utilizes devices requiring relatively low operating power and low operating potentials, which, coupled with the small size of the system components, results in a system which is orders of magnitude smaller than existing systems. It is further recognized that switching matrices utilizing the crosspoint configurations of FIGS. 2, 3 and 4 are readily capable of integrated circuit fabrication.

While the foregoing description is illustrative of some embodiments of the invention, it will be apparent to those skilled in the art that many modifications and variations may be made without departing from the true spirit of the invention. It is, therefore, intended that the invention not be limited to the specifics of the foregoing description, but rather to embrace the full scope of the following claims.

I claim:

1. A crosspoint switching matrix comprising:

first and second pluralities of transmission line groups, each having at least one transmission line and one control line;

a first resistor connected between the control lines of said first and second pluralities of transmission line groups at each crosspoint of said crosspoint switching matrix;

a controlled latching semiconductor device for each transmission path between a first and second transmission line group, each of said semiconductor devices having first and second signal electrodes and a gate electrode, said first and second signal electrodes being connected between respective transmission lines in said first and second pluralities of transmission line groups;

a second resistor for each of said controlled latching semiconductor devices, said resistor connected between the gate and the first signal electrode of its respective semiconductor device;

means for coupling the signals developed across said first resistor to the gate and first signal electrodes of each of said controlled latching semiconductor devices; and means for applying coincidence pulses to selected control lines in said first and second pluralities of transmission line groups to thereby establish a particular transmission path between the selected transmission lines of said first and second transmission line groups.

2. The invention according to claim 1, wherein said means for coupling signals developed across said first resistor to the gate and first signal electrodes of each of said controlled latching semiconductor devices comprises:

first and second capacitors respectively connected between opposite ends of said first resistor and the first signal electrode and the gate electrode, respectively, of each of said controlled latching semiconductor devices.

3. The invention according to claim 1, wherein said means for coupling signals developed across said first resistor to the gate and first signal electrodes of each of said controlled latching semiconductor devices comprises:

first and second diodes respectively connected between opposing ends of said first resistor and the gate and first signal electrodes, respectively, of each of said controlled latching semiconductor devices.

4. The invention according to claim 1, wherein said means for coupling signals developed across said first resistor to the gate and first signal electrodes of each of said controlled latching semiconductor devices comprises:

a transistor having base, emitter and collector electrodes, said base and emitter electrodes connected, respectively, to opposing ends of said first resistor; and a diode connected between the collector electrode of said transistor and the gate electrode of each of said controlled latching semiconductor devices.

5. The invention according to claim 1, wherein said means for coupling signals developed across said first resistor to the gate and first signal electrodes of each of said controlled latching semiconductor devices comprises:

a transistor for each of said controlled latching semiconductor devices, each of said transistors having base, emitter and collector electrodes, with the collector electrode of each transistor connected directly to the gate electrode of its respective controlled latching semiconductor device; and means for connecting the base and emitter electrodes of each of said transistors to respective opposite ends of said first resistor.

6. A switching system comprising:

first and second pluralities of line circuits;

a plurality of link circuits;

first and second networks of crosspoint switching matrices, said first network of switching matrices connected between said first plurality of line circuits and said plurality of link circuits, and said second network of switching matrices connected between said plurality of link circuits and said second plurality of line circuits to provide a multplicity of transmission paths between said first and second pluralities of line circuits, each of said crosspoint switching matrices in said networks comprising:

first and second pluralities of transmission line groups, each having at least one transmission line and at least one control line, a multiplicity of controlled latching semi-conductor crosspoint circuits connected between said first and second pluralities of transmission line groups for enabling the transmission lines in any of said first plurality of transmission line groups to be connected to the respective transmission lines in any of said second plurality of transmission line groups, means for applying control pulses to the control lines of selected ones of said first and second pluralities of transmission line groups to establish transmission paths between respective transmission lines of said first and second pluralities of transmission line groups, and means for inserting a high impedance in said transmission path to effect a disconnect of said controlled latching device in said transmission path while maintaining isolation between other transmission paths.

7. The invention according to claim 6, wherein each of said multiplicity of controlled latching semiconductor crosspoint circuits comprises:

a plurality of controlled latching semiconductor devices equal to thenumber of transmission paths between said first and second pluralities of transmission line groups, each of said devices having first and second signal electrodes and a gate electrode, the first signal electrode being connected to a transmission line in one of said first plurality of transmission line groups, and the second signal electrode being connected to a transmission line in one of said second plurality of transmission line groups;

a first resistor for each circuit connected between the control lines of said first and second transmission line groups;

a plurality of resistors equal to the number of controlled latching semiconductor devices in said circuit, each of said plurality of resistors connected between the first signal electrode and the gate electrode of its respective controlled latching semiconductor device; and means for coupling the signal developed across said first resistor to each of said controlled latching semiconductor devices.

8. The invention according to claim 6, wherein each of said link circuits comprises:

a plurality of pairs of diodes, each diode having an input and an output electrode, with each of said pairs of diodes having their input electrodes connected back to back;

a source of energizing potential;

a first plurality of resistors connected between said source of energizing potential and the input electrodes of each respective pair of diodes; and second and third pluralities of resistors connected between said source of energizing potential and the respective opposite output electrodes of said pairs of diodes.

9. The invention according to claim 6, wherein each of said line circuits comprises:

a transformer having a primary winding and first and second secondary windings;

first and second diodes each having input and output electrodes, with the input electrodes of said diodes connected back to back;

means connecting the output electrodes of said first and second diodes between and in series with the first and second secondary windings of said transformer;

a transistor having base, emitter and collector electrodes;

a source of control pulses connected to the base electrode of said transistor;

a source of energizing potential connected to the emitter electrode of said transistor;

a first resistor connected between the input electrodes of first and second diodes and the collector electrode of said transistor; and second and third resistors connected between the collector electrodes of said transistor and the respective output electrodes of said first and second diodes.

10. The invention according to claim 6, wherein each of said networks of crosspoint switching matrices comprises:

a plurality of stages of crosspoint switching matrices each consisting of at least two crosspoint switching matrices, each of said matrices having a plurality of input transmission line groups and a plurality of output transmission line groups, and each of said transmission line groups having a plurality of transmission lines and at least one control line;

means connecting the output transmission lines in a transmission line group in one stage of said switching network to the input transmission lines in a transmission line group in an adjacent stage of said switching network;

a multiplicity of transistors, each having base, emitter and collector electrodes, the collector and emitter electrodes of each of said transistors being connected between respective input and output control lines of matrix transmission line groups in adjacent stages of said switching network;

a source of control signals connected to the base electrodes of each of said transistors;

first and second sources of energizing potential;

means connecting the control lines of each of the input transmission line groups of each matrix in the first stage of said switching network to said first source of energizing potential; and means connecting the control lines of each of the output transmission line groups of each matrix in the last stage of said switching network to said second source of energizing potential.

11. The invention according to claim 7, wherein said means for coupling the signal developed across said first resistor to each of said controlled latching semiconductor devices comprises:

a transistor having base, emitter and collector electrodes, the emitter electrode of said transistor connected to one end of said first resistor, the base electrode of said transistor connected to the opposite end of said first resistor, and the collector electrode of said transistor connected to the gate electrode of said controlled latching semiconductor device.

12. The invention according to claim 7, wherein said means for coupling the signal developed across said first resistor to said controlled latching semiconductor devices includes:

a transistor having base, emitter and collector electrodes;

means connecting the base and emitter electrodes of said transistor to respective opposite ends of said first resistor; and a diode connected between the collector electrode of said transistor and the gate electrode of said controlled latching semiconductor device.

13. The invention according to claim 7, wherein said means for coupling the signal developed across said first resistor to each of said controlled latching semiconductor devices conmprises:

first and second capacitors respectively connected between opposite ends of said first resistor and the first signal electrode and the gate electrode, respectively, of each of said controlled latching semiconductor devices.

14. The invention according to claim 7, wherein said means for coupling the signal developed across said first resistor to each of said controlled latching semiconductor devices comprises:

first and second diodes respectively connected between opposite ends of said first resistor and the first signal electrode and the gate electrode, respectively, of each of said controlled latching semiconductor devices.

References Cited

UNITED STATES PATENTS

| | | | |
|---|---|---|---|
| 2,889,537 | 6/1959 | Elliott | 340—166 |
| 3,118,973 | 1/1964 | Kasper et al. | 179—18.7 |
| 3,201,764 | 8/1965 | Parker | 307—252 |
| 3,251,036 | 5/1966 | Smith. | |

OTHER REFERENCES

Burke, H.W.: RCA TN No. 503, March 1962.

KATHLEEN H. CLAFFY, Primary Examiner

W. A. HELVESTINE, Assistant Examiner

U.S. Cl. X.R.

307—252; 340—166